United States Patent

Barzynski et al.

Patent Number: 4,889,756
Date of Patent: Dec. 26, 1989

[54] SHEET-LIKE, MULTILAYER, LASER-OPTICAL RECORDING MATERIAL

[75] Inventors: Helmut Barzynski, Bad Duerkheim; Heidi Benthack-Thomas, Limburgerhof; Karl-Ruediger Hellwig, Moerstadt; Christof Taubitz, Wachenheim, all of Fed. Rep. of Germany

[73] Assignee: BASF Aktiengesellschaft, Ludwigshafen, Fed. Rep. of Germany

[21] Appl. No.: 231,384

[22] Filed: Aug. 12, 1988

[30] Foreign Application Priority Data

Aug. 14, 1987 [DE] Fed. Rep. of Germany ....... 3727093

[51] Int. Cl.$^4$ ................................................. B32B 3/02
[52] U.S. Cl. ......................................... 428/64; 428/65; 428/409; 428/913; 369/288; 346/76 L; 346/135.1; 930/945
[58] Field of Search .................. 428/64, 65, 409, 913, 428/; 369/288; 346/76 L, 135.1; 430/945

[56] References Cited

U.S. PATENT DOCUMENTS 4,373,065 2/1983 Prest, Jr. .

FOREIGN PATENT DOCUMENTS 0225801 6/1987 European Pat. Off.

Primary Examiner—Henry F. Epstein
Assistant Examiner—P. J. Ryan
Attorney, Agent, or Firm—Keil & Weinkauf

[57] ABSTRACT

Laser-optical recording material comprises:
(a) an optically transparent and isotropic, homogeneous substrate which is free of orientation birefringence and
(b) one or more amorphous, thermally alterable recording layers, wherein the substrate (a)
(a$_1$) has one or two structured surfaces, the structures being in the micrometer and/or submicrometer range, and is formed form a blend of poly-(2,6-dimethylphenylene ether) (PPE) with one or more styrene polymers, the content of PPE in this blend being about 25–45% by weight, based on the blend, and
(a$_2$) that part of the blend which is not PPE contains, based on this part (a$_2$),
(a$_{21}$) from 0.1 to 8% by weight of cyanoethylene groups and/or
(a$_{22}$) from 1 to 60% by weight of 1-methyl-1-phenylethylene groups and/or
(a$_{23}$) from 1 to 60% by weight of 4'-methylphenylethylene groups and/or
(a$_{24}$) from 0.01 to 10% by weight of groups of the general formula I

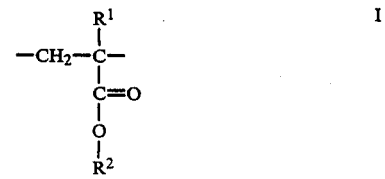

where $R^1$ is hydrogen or methyl and $R^2$ is $C_1$–$C_{10}$-alkyl, $C_5$–$C_8$-cycloalkyl or $C_6$–$C_{10}$-aryl, and in any case,
(a$_{25}$) not less than 40% by weight of phenylethylene groups.

Audio or video compact disks which contains a substrate having the said composition are also claimed.

28 Claims, No Drawings

SHEET-LIKE, MULTILAYER, LASER-OPTICAL RECORDING MATERIAL

The present invention relates to a novel sheet-like, multilayer, laser-optical recording material which has improved performance characteristics and comprises
  (a) one or more layers of an optically transparent and isotropic, homogeneous blend which is free of orientation birefringence and consists essentially of poly-(2,6-dimethylphenylene ether) (PPE) and a styrene polymer, as a substrate, and
  (b) one or more amorphous, thermally alterable recording layers.

Recording materials of this type are disclosed in, for example, U.S. Pat. No. 4 373 065 or EP-A-225 801.

For the purposes of the present invention, the term sheet-like includes all spatial forms whose thickness is substantially smaller than their length and width. Accordingly, these may be tape-like, plate-like or disk-like recording materials, the disk-like recording materials generally being referred to as data disks or simply disks.

The term amorphous indicates that the material of the recording layers (b) has no crystalline regions which are larger than the thermally alterable regions, but that it is optically isotropic in this order to magnitude.

Digital data are written, in the form of thermally altered regions, into the recording layers (b) of recording materials of the type under discussion by means of pulse-modulated write laser beams. The write laser beams are focused on the recording layers (b) and/or strike the said layers at right angles. For recording analog data, it is also possible to use continuous-wave lasers. In the case of recorded digital data, the thermally altered regions of the recording layers (b) have a circular or elliptical base area. In the case of analog data, the thermally altered regions have base areas of any shape.

The data are read using in general continuously emitted read laser beams (continuous-wave laser beams) whose energy is not sufficient to produce further changes in the recording layers (b). The read laser beams are likewise focused on the recording layers (b) and/or strike the latter at right angles. In the read operation, in general the light reflected by the recording layers (b) is collected with the aid of suitable optical arrangements, conveyed to conventional and known detectors and converted into signals by suitable electronic apparatuses.

This write and read process and the corresponding suitable recording materials are therefore generally referred to with the term laser-optical, the write and read process generally being subsumed under the term data recording.

The thermally altered regions of the recording layers (b) may be in the form of holes which completely penetrate the recording layer. In this case, the term ablative laser-optical data recording is generally used. During reading of the data by means of a read laser beam, the different reflectivities of the holes and the unchanged regions of the recording layer (b) are utilized. To obtain high sensitivity and a high signal to noise ratio, it is also possible to use a reflector layer, which is bared by hole formation and reflects the read laser beam particularly intensely.

The thermally altered regions may also be in the form of pits which may have a cleanly formed wall. In this case, the term deformative laser-optical data recording is used. In this procedure, the data are read via diffraction of the light of the read laser beam at the pits.

The thermal change can also result in regions in which, instead of ablation or deformation, phase transformation of the material of the recording layer into a different modification has taken place. In such a case, the term used is laser-optical data recording by phase change. In general, the phase change reduces the reflectivity in the regions described and/or increases the light transmittance. However, under certain circumstances the opposite may also occur, ie. the reflectivity is increased and/or the light transmittance reduced. In general, the regions thermally altered in this manner are referred to as spots.

The recording layers (b) can, however, also be underlaid with layers which expand or evolve gases on exposure, with the result that the recording layers (b) expand locally. Consequently, relief structures, which contain the recorded data, form in the surface of the recording layers (b).

However, the gases can also be liberated in the recording layers (b) themselves with formation of small light-scattering bubbles. This is referred to in general as vesicular data recording.

In addition, a chemical reaction of one component or a chemical reaction between a plurality of components of the recording layer (b) may have taken place in the thermally altered regions, with the result that the optical properties of the recording layers (b) in these regions have been changed.

A local change in the reflectance of recording layers (b) on exposure can, however, also occur as a result of the enlargement or fusion of small particles. These small particles, for example gold grains, can be incorporated in a matrix. However, they may also be plastic spheres coated with metal by vapor deposition. Recording layers (b) which consist of these spheres have an extremely low basic reflectivity and are generally referred to as moth eye layers.

Furthermore, the thermally altered regions in recording layers (b), which consist of amorphous, ferrimagnetic layers magnetized at right angles to their surface, may be in the form of spots which have a magnetization direction opposite to the original direction. These spots are formed during heating the ferrimagnetic material of these layers by a laser beam under the influence of an applied auxiliary magnetic field. As a result of heating, the coercive force $H_c$ of the ferrimagnetic material increases. If the coercive force $H_c$ falls below the field strength of the applied auxiliary magnetic field at a critical temperature dependent on the particular material used, the relevant region undergoes magnetic reversal.

These regions are read using linearly polarized light of a continuously emitting continuous-wave laser whose light output is not sufficient to heat the material to above the critical temperature. This laser beam is reflected either by the recording layer (b) itself or by a reflector layer arranged behind it, the result being an interaction between the magnetic moments in the recording layer (b) and the magnetic vector of the laser light wave. Owing to this interaction, the plane of polarization $\vec{E}$ of the laser light which is reflected by a spot or by a reflector layer behind is rotated through a small angle with respect to the original plane. If this rotation of the plane of polarization $\vec{E}$ takes place during reflection of the light at the recording layer (b) itself, this is referred to as the Kerr effect and the angle of rotation accordingly as the Kerr angle; if, on the other hand, the plane is rotated during passage of the light twice through the recording layer, the terms Faraday effect and Faraday angle are used.

This rotation of the plane of polarization $\bar{E}$ of the laser light reflected by the recording material can be measured with the aid of suitable optical and electronic apparatuses and converted into signals.

Recording layers (b) of this type are therefore referred to in general as magneto-optical.

In the case of multilayer, laser-optical disks and the known audio and video compact disks, writing and/or reading of digital data are generally carried out using the conventional disk drives. Such a disk drive essentially contains a disk turntable and a laser-optical write and read head, as well as mechanical servo systems for correcting the track position, autofocusing means, optical elements for analysis of track position errors and autofocus errors, detector means with upstream optical components for collecting the light of the read laser beam reflected by the disks, and suitable electronic components. Usually, a laser-optical write and read head contains laser diodes which emit infrared light and consist of semiconductor materials, such as GaAlAs. Moreover, such a write and read head generally also has further suitable optical components, such as dielectric beam dividers, polarization beam dividers or polarization-independent beam dividers and a $\lambda/4$ or $\lambda/2$ plate.

In general, the known laser-optical recording materials contain a dimensionally stable substrate, which in the case of laser-optical disks or the known audio and video compact disks is usually a 1.2 mm thick, optically clear disk which has a diameter from 83 to 350 mm and consists of plastic or a plastics blend. Examples of suitable plastics are polycarbonate, polymethyl methacrylate, polymethylpentene, cellulose acetobutyrate or mixtures of poly-(vinylidene fluoride) and polymethyl methacrylate. However, substrates of this type have serious disadvantages, for example excessively high optical orientation coefficients (orientation birefringence), an excessively high processing temperature, excessively low heat distortion resistance, an excessively low modulus of elasticity, excessively low hardness and excessively high water absorption. Depending on the plastic or plastics blend used, a greater or smaller number of disadvantages are encountered; none of the known materials has an optimum property profile.

However, if the dimensionally stable substrate corresponds to a layer (a) of the laser-optical recording material disclosed in U.S. patent application No. 4 373 065, many of the stated disadvantages do not in general occur. Such a layer (a), which consists of poly-(2,6-dimethylphenylene ether) (PPE) and polystyrene, is optically transparent and isotropic, homogeneous, free of orientation birefringence, heat distortion-resistant and mechanically stable. Moreover, it has low water absorption. This property profile of the layer (a) is retained when it is used as a substrate.

Nevertheless, these substrates have disadvantages which prevent them from being used in practice. For example, the processing temperature of the known polystyrene/PPE blends is undesirably high owing to their poor flow properties. If an attempt is made to eliminate this problem by reducing the PPE content and/or by decreasing the molecular weight of the polystyrene, further disadvantages are introduced, for example increased orientation birefringence, a lower modulus of elasticity and poor solvent resistance. Laser-optical recording materials which contain such substrates and the same type of recording layer (b) often have a greatly varying signal-to-noise ratio. Furthermore, frequent unpredictable problems are encountered in recovering the recorded data, ie. the tracking behavior of such recording materials is not very satisfactory and is inadequate in practice, where rapid access to the data is essential. Nor are these disadvantages completely eliminated or the existing problems satisfactorily resolved using the substrate materials disclosed in EP-A-225 801 and consisting of PPE/polystyrene blends which contain a relatively low molecular weight PPE to reduce the processing temperature.

It is an object of the present invention to provide a novel, sheet-like, laser-optical recording material which does not have the disadvantages of the prior art.

We have found that this object is achieved by a novel, sheet-like, multilayer, laser-optical recording material comprising:
(a) one or more layers of an optically transparent and isotropic, homogeneous mixture of poly-(2,6-dimethylphenylene ether) (PPE) and a styrene polymer which is free of orientation birefringence, as the substrate, and
(b) one or more amorphous, thermally alterable recording layers, wherein the layer (a) forming the dimensionally stable substrate ($a_1$) has one or two structured surfaces, the structures being in the micrometer and/or submicrometer range, and is composed of a blend containing a PPE and one or more styrene polymers, with or without additives, and in which the content of PPE is from 25 to 45% by weight, based on the blend, and in which ($a_2$) that part of the blend which is not PPE contains, based on this part ($a_2$),
($a_{21}$) from 0.1 to 8% by weight of cyanoethylene groups and/or
($a_{22}$) from 1 to 60% by weight of 1-methyl-1-phenylethylene groups and/or
($a_{23}$) from 1 to 60% by weight of 4'-methylphenylethylene groups and/or
($a_{24}$) from 0.01 to 10% by weight of groups of the general formula I

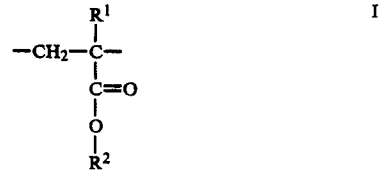

where $R^1$ is hydrogen or methyl and $R^2$ is $C_1$–$C_{10}$-alkyl, $C_5$–$C_8$-cycloalkyl or $C_6$–$C_{10}$-aryl, with the proviso that
($a_{25}$) regardless of whether one or more of the groups ($a_{21}$) to ($a_{24}$) and moreover any additives are present in ($a_2$), the part ($a_2$) in any case contains not less than 40% by weight of phenylethylene groups.

An essential component of the novel recording material is the layer (a) which forms the dimensionally stable substrate and is referred to below simply as substrate (a)

to be used according to the invention or simply as substrate (a).

The substrate (a) to be used according to the invention has one or two structured surface(s) ($a_1$). These surfaces ($a_1$) face the recording layer or layers (b). Substrates (a) which have only one structured surface ($a_1$) are preferred.

The structures in the surface ($a_1$) are in the micrometer and/or submicrometer range. They serve for exact guidance of the read laser beam and ensure rapid and exact response of the tracking servo and autofocusing means in the laser-optical write and read heads of the disk drives, ie. they permit or improve tracking. Furthermore, these structures may themselves contain or represent data, as is the case, for example, in the known audio or video compact disks, or they may serve for coding the recorded data. The structures consist, as a rule, of raised parts and/or indentations. These are in the form of continuous concentric or spiral tracks or isolated hills and/or holes. In addition, the structure can have a more or less smooth wavy shape. The tracks are preferred. In their transverse direction, they have a right-angled sawtooth-like, V-shaped or trapezoidal contour. Their indentations are generally referred to as grooves and their raised parts as land. Of particular advantage are tracks having 50–200 nm deep and 0.4–0.8 μm wide grooves separated by a 1–3 μm wide land.

The blend which, according to the invention, forms the substrate (a) contains from 25 to 45, preferably from 32 to 42, in particular from 34 to 40, % by weight, based on the blend, of poly-(2,6-dimethylphenylene ether) (PPE). The intrinsic viscosity of the PPE is in general from 0.5 to 0.8, preferably from 0.5 to 0.7, dl/g (measured at 25° C. in chloroform). Processes for the preparation of PPE are disclosed in, for example, EP-A-0 161 454.

This blend furthermore contains a part ($a_2$) which is not PPE. This part ($a_2$) accounts for from 55 to 75, preferably from 58 to 68, in particular from 60 to 66, % by weight of the blend.

Particularly advantageous blends which are especially suitable for producing the substrate (a) consist of from 34 to 40% by weight of PPE and from 60 to 66% by weight of the part ($a_2$).

According to the invention, the part ($a_2$) contains polymers which contain, as an essential component, copolymerized styrene, or the part ($a_2$) essentially consists of polystyrene. For the purposes of the present invention, essentially in this case means a polymerized styrene content in the polymers of part ($a_2$) of more than 40% by weight, which is equivalent to a content of more than 40% by weight of phenylethylene groups. This content should not fall below 40% by weight since otherwise a certain degree of separation of the part ($a_2$) and the PPE may occur in the course of time, finally leading to opacity of the substrate (a) and making the latter useless.

According to the invention, the part ($a_2$) of the blend of PPE and ($a_2$) contains groups ($a_{21}$), ($a_{22}$), ($a_{23}$) and/or ($a_{24}$), which are used individually or in combination. Regardless of whether one or more of these groups ($a_{21}$) to ($a_{24}$) are used, the content of ($a_{25}$) phenylethylene groups in ($a_2$) does not fall below 40% by weight; at the very least, it is equal to 40% by weight.

Accordingly, the part ($a_2$) of the blend which forms the substrate (a) to be used according to the invention can consist of the following combinations of groups or contain these combinations of groups:

phenylethylene+($a_{21}$),
phenylethylene+($a_{21}$)+($a_{22}$),
phenylethylene+($a_{21}$)+($a_{23}$),
phenylethylene+($a_{21}$)+($a_{24}$),
phenylethylene+($a_{21}$)+($a_{22}$)+($a_{23}$),
phenylethylene+($a_{21}$)+($a_{22}$)+($a_{24}$),
phenylethylene+($a_{21}$)+($a_{23}$)+($a_{24}$),
phenylethylene+($a_{21}$)+($a_{22}$)+($a_{23}$)+($a_{24}$),
phenylethylene+($a_{22}$),
phenylethylene+($a_{22}$)+($a_{23}$),
phenylethylene+($a_{22}$)+($a_{24}$),
phenylethylene+($a_{22}$)+($a_{23}$)+($a_{24}$),
phenylethylene+($a_{23}$),
phenylethylene+($a_{23}$)+($a_{24}$) and
phenylethylene+($a_{24}$).

The combinations of the phenylethylene groups ($a_{25}$) and the groups ($a_{21}$), ($a_{22}$), ($a_{23}$) or ($a_{24}$) and the combinations of the phenylethylene groups ($a_{25}$) and the groups ($a_{22}$) and ($a_{23}$) are particularly advantageous.

Among these, the combination of the phenylethylene groups ($a_{25}$) and the groups ($a_{22}$) and ($a_{23}$) is in turn very particularly preferred.

The group ($a_{21}$) is the cyanoethylene group, which is derived from the monomer acrylonitrile. If this group is present alone in ($a_2$), its amount should not fall below 0.1, preferably 1, in particular 5, % by weight, based on ($a_2$). If other groups ($a_{22}$), ($a_{23}$) and/or ($a_{24}$) are used in addition to this group, its amount is from 0.1 to 8% by weight. Regardless of whether ($a_{21}$) is used alone or together with other groups ($a_{22}$), ($a_{23}$) and/or ($a_{24}$), the content of this group in ($a_2$) should not exceed 8% by weight, since otherwise there is a danger that the blend of ($a_2$) and PPE will separate.

The group ($a_{22}$) is the 1-methyl-1-phenylethylene group, which is derived from the monomer α-methylstyrene. If this group is present alone in ($a_2$), its amount should not fall below 1, preferably 2, in particular 4, % by weight, based on ($a_2$) and should not exceed 60% by weight, based on ($a_2$). We have found that an amount of from 1 to 30, preferably from 1 to 10, in particular from 3 to 6, % by weight of ($a_{22}$) in ($a_2$) is particularly advantageous. If this group is used together with other groups ($a_{21}$), ($a_{23}$) and/or ($a_{24}$), its content in ($a_2$) is reduced by the amount of the other groups ($a_{21}$), ($a_{23}$) and/or ($a_{24}$) present in ($a_2$), provided that the total amount of the groups ($a_{21}$) to ($a_{24}$) reaches 60% by weight of ($a_2$). It is advantageous if the weight ratio of ($a_{22}$) to the groups ($a_{21}$) and/or ($a_{24}$) is greater than 1, where these groups are present.

The group ($a_{23}$) is the 4'-methylphenylethylene group, which is derived from the monomer p-methylstyrene. If this group is present alone in ($a_2$), its amount should not fall below 1, preferably 2, in particular 4, % by weight, based on ($a_2$), and should not exceed 60% by weight, based on ($a_2$). We have found that an amount of from 1 to 30, preferably from 1 to 10, in particular from 3 to 6, % by weight of ($a_{23}$) in ($a_2$) is particularly advantageous here. If this group is used together with other groups ($a_{21}$), ($a_{22}$) and/or ($a_{24}$), its content in ($a_2$) is likewise reduced by the amount of the other groups ($a_{21}$), ($a_{22}$) and/or ($a_{24}$) present in ($a_2$), provided that the total amount of the groups ($a_{23}$), ($a_{21}$), ($a_{22}$) and/or ($a_{24}$) reaches 60% by weight of ($a_2$). However, it is very particularly advantageous to use the group ($a_{23}$) and the group ($a_{22}$) together. In this case, the weight ratio of ($a_{23}$) to ($a_{22}$) can vary within a wide range, with the proviso that the amount of ($a_{22}$) or of ($a_{23}$) in the part ($a_2$) does not fall below 1% by weight.

The group ($a_{24}$) is a group of the general formula (I), which is derived from an acrylate or methacrylate. Examples of suitable groups ($a_{24}$) are the 1-carboxymethyl-, -ethyl-, -propyl-, -isopropyl-, -n-butyl-, -tertbutyl-, -amyl-, -hexyl-, -heptyl-, -octyl-, -2'-ethylhexyl-, -nonyl-, -decyl-, -cyclopentyl-, -cyclohexyl-, -2'-methylcyclohexyl-, -2',4'-dimethylcyclohexyl-, -phenyl-, -4'-methylphenyl- or 1-carboxynaphthylethylene groups or the corresponding 1-methylethylene groups. These suitable groups are derived from the methyl, ethyl, propyl, isopropyl, n-butyl, sec-butyl, tert-butyl, amyl, hexyl, heptyl, octyl, 2'-ethylhexyl, nonyl, decyl, cyclopentyl, cyclohexyl, 2'-methylcyclohexyl, 2',4'-dimethylcyclohexyl, phenyl, 4'-methylphenyl or naphthyl ester of acrylic acid or methacrylic acid. Among these, the groups ($a_{24}$), which are derived from the methacrylates, are particularly preferred, of which in turn the 1-carboxy-2'-ethylhexyl-, 1-carboxyphenyl- and 1-carboxy-4'-methylphenyl-1-methylethylene groups are very particularly preferred. These may be used individually or in combination.

If groups ($a_{24}$) are present alone in ($a_2$), their amount should not fall below 0.01, preferably 1, in particular 4, % by weight, based on ($a_2$), and should not exceed 10% by weight, based on ($a_2$). It is particularly advantageous if the groups ($a_{24}$) are used not alone but together with the other groups ($a_{21}$), ($a_{22}$) and/or ($_{23}$). The weight ratio of ($a_{24}$) to these other groups is from 0.01 to 1, in particular from 0.2 to 1. When this group ($a_{24}$) is used together with the other groups ($a_{21}$), ($a_{22}$) and/or ($a_{23}$), its content in ($a_2$) should not exceed the maximum limit applicable for its use individually, ie. 10% by weight, based on ($a_2$), and should not fall below the applicable lower limit of 0.01% by weight, based on ($a_2$).

According to the invention, the groups ($a_{21}$), ($a_{22}$), ($a_{23}$) and/or ($a_{24}$) in part ($a_2$) of the blend of PPE and ($a_2$) forming the substrate (a) can be present as randomly distributed monomer units in the polymer main chains of styrene copolymers. These are random copolymers of styrene and the corresponding monomers, as are known per se and can be prepared by free radical copolymerization. These random copolymers generally have a number average molecular weight $\overline{M}_n$ of from $2 \times 10^3$ to $3 \times 10^5$. The copolymers must have the abovementioned compositions to be used according to the invention. Examples of particularly advantageous random copolymers are copolymers prepared by free radical copolymerization of 93 parts by weight of styrene and 7 parts by weight of acrylonitrile;

95 parts by weight of styrene, 3 parts by weight of acrylonitrile, 1 part by weight of 2-ethylhexyl methacrylate and 1 part by weight of phenyl methacrylate;

70 parts by weight of styrene and 30 parts by weight of α-methylstyrene;

70 parts by weight of styrene and 30 parts by weight of p-methylstyrene;

60 parts by weight of styrene, 15 parts by weight of α-methylstyrene and 25 parts by weight of p-methylstyrene;

or 50 parts by weight of styrene, 45 parts by weight of α-methylstyrene, 3 parts by weight of acrylonitrile and 2 parts by weight of 4'-methylphenyl methacrylate, of which the styrene/α-methylstyrene, styrene/p-methylstyrene and styrene/α-methylstyrene/p-methylstyrene copolymers are very particularly preferred.

According to the invention, the groups ($a_{21}$), ($a_{22}$), ($a_{23}$) and/or ($a_{24}$) in part ($a_2$) of the blend of PPE and ($a_2$) forming the substrate (a) can, however, also be in the form of homogeneous oligomeric or polymeric blocks of ($a_{21}$), ($a_{22}$), ($a_{23}$) and/or ($a_{24}$). These blocks may be incorporated as a component of styrene copolymers in the polymer main chains of the styrene polymers and/or may be bonded as side radicals to the polymer main chains of the styrene polymers. In this case, the polymers are therefore graft or block copolymers of styrene with acrylonitrile, α-methylstyrene, p-methylstyrene and/or the abovementioned (meth)acrylates. Such graft and block copolymers are known per se and can be prepared by the conventional procedures. The exact way in which the blocks used are bonded with one another can be varied as desired, provided that the block and graft copolymers have the abovementioned overall compositions to be used according to the invention. If these compositions are outside the critical limits, the relevant block or graft copolymers are unsuitable for producing the substrate (a) to be used according to the invention, regardless of any specific type of block linkage.

However, it is particularly advantageous according to the invention if, in part ($a_2$) of the blend of PPE and ($a_2$) forming the substrate (a), the groups ($a_{21}$), ($a_{22}$), ($a_{23}$) and/or ($a_{24}$) form the monomer units of oligomeric or polymeric homopolymers, copolymers or block or graft copolymers which are prepared separately and then mixed with polystyrene in an amount such that the composition of the part ($a_2$) resulting in this manner is within the abovementioned critical limits. In this case, the blend forming the substrate (a) therefore consists of PPE, polystyrene, one or more homopolymers or copolymers of the groups ($a_{21}$), ($a_{22}$), ($a_{23}$) and/or ($a_{24}$) and, if required, further additives. The polystyrene generally has a weight average molecular weight $\overline{M}_w$ of more than $8 \times 10^4$, in particular from $1 \times 10^5$ to $2 \times 10^5$. It is particularly advantageous if the groups ($a_{22}$) and ($a_{23}$) are used together. These groups preferably form the monomer units of oligomeric α-methylstyrene/p-methylstyrene copolymers, which can be prepared in a conventional manner by free radical copolymerization in the absence of a solvent or in solution and are then added to the polystyrene in the amounts required according to the invention. The copolymers of this type which are very particularly preferred according to the invention have a number average molecular weight $\overline{M}_n$ of from $5 \times 10^3$ to $1.5 \times 10^4$. In general, they have a weight average molecular weight $\overline{M}_w$ of from $5 \times 10^3$ to $3 \times 10^4$, preferably from $6 \times 10^3$ to $2.5 \times 10^4$, in particular from $7 \times 10^3$ to $2 \times 10^4$. In general, these copolymers consist of from 1 to 99, in particular from 2 to 98, % by weight, of 1-methyl-1-phenylethylene groups ($a_{22}$) and from 99 to 1, in particular from 98 to 2, % by weight of 4'-methylphenylethylene groups ($a_{23}$), the percentages being based on the amount of the particular copolymer. These copolymers are added to the polystyrene in an amount of from 1 to 30, preferably from 4 to 23, in particular from 4 to 5, % by weight, based on ($a_2$), and it has further proven extremely advantageous to add from about 7.5 to about 16% by weight, based on ($a_2$) of these copolymers to the polystyrene. Care should be taken to ensure that the lower limits of, in each case, 1% by weight, based on ($a_2$), which are applicable for the use of the groups ($a_{22}$) and ($a_{23}$) individually, are not fallen below, which can easily be avoided by selecting copolymers having an appropriate composition. However, we have found that, in the case of the particularly preferred embodiment of the invention described above, according to which the part ($a_2$) of the blend forming the substrate (a) consists of a mixture which may contain additives and is composed of polystyrene and low molecular weight α-methylstyrene/p-methylstyrene copolymers described above, these lower limits applicable for the use of the groups ($a_{22}$) and ($a_{23}$) individually are not so critical, so that in this case it is also possible to deviate from them, ie. it is possible to fall below one of these lower limits for ($a_{22}$) or ($a_{23}$) without having to accept serious disadvantagws.

Furthermore, the part ($a_2$) of the blend of PPE and ($a_2$) forming the substrate (a) may contain compatible additives, the term compatible meaning that these additives are distributed in the mixture without causing opacity and furthermore do not produce opacity there in the course of time under the influence of laser light. These additives should therefore generally be present in molecular disperse form in the blend. Moreover, they should exhibit onlgy slight absorption, if any at all, of light of wavelength λ in the range from 720 to 1,000 nm. In general, these additives may be antioxidants, lubricants, plasticizers and dyes. Examples of suitable additives are tert-butylcresol, white oil and zinc stearate. The additives can be added in an amount of up to 10% by weight, based on ($a_2$), in which case it should be ensured that the polystyrene content or the content of phenylethylene groups ($a_{25}$) in ($a_2$) does not fall below 40% by weight.

A very particularly preferred substrate (a) of the novel sheet-like, multilayer, laser-optical recording material possesses, in one of its surfaces ($a_1$), concentric or spiral tracks or other structures suitable for guiding the laser beams, and consists of a blend of, based on the blend, from 34 to 40% by weight of PPE and
from 60 to 66% by weight of part ($a_2$),
the part ($a_2$) of this blend consisting of, based on ($a_2$),
  from 68.7 to 96.889 by weight of polystyrene having a weight average molecular weight $\overline{M}_w$ of more than $8 \times 10^4$,
  from 3 to 25% by weight of a random copolymer of, based on its amount, from 2 to 98% by weight of copolymerized α-methylstyrene and from 98 to 2% by weight of copolymerized p-methylstyrene, having a weight average molecular weight $\overline{M}_w$ of from $7 \times 10^3$ to $2 \times 10^4$,
  from 0.1 to 6% by weight of a plasticizer, eg. while oil,
  from 0.01 to 0.1% by weight of an antioxidant, eg. tert-butylcresol, and
  from 0.001 to 0.2% by weight of a dye which absorbs light of a wavelength λ>720 nm only weakly, if at all.

The further essential component of the novel, sheet-like, multilayer, laser-optical recording material is its amorphous, theramally alterable recording layer (b). These layers are the usual, known recording layers as conventionally used for laser-optical data recording by the principles described at the outset. In general, the recording layer (b) is from 10 to 500 nm thick.

The novel recording materials may also contain further layers which may also be important for the functioning of the recording materials, for example conventional and known reflector layers, antireflection layers or adhesion-promoting layers or layers which decompose and form gases on heating. In addition, the recording layers (b) may furthermore be covered with optically transparent protective layers which prevent dirt particles or scratches entering the laser focus or corrosion of the layers (b). In general, conventional polymers or silicas are used to this end. For this purpose, the novel recording material may also be connected to an optically transparent cover in a conventional manner, for example by ultrasonic welding.

Two novel recording materials can moreover be joined to one another in pairs in such a way that their recording layers face one another and are parallel and there is a certain distance between them. This distance can be obtained in a conventional manner with the aid of spacers, such as webs or small columns. However, a single novel recording material can moreover possess two recording layers on the opposite sides of a substrate (a).

The novel recording material can be produced by a conventional method known from the prior art. In general, such methods are based on shaping of the blend forming the substrate (a) by means of injection molding. Usually, and advantageously, the structured surface ($a_1$) of the substrate (a) is produced in the desired form during injection molding of the substrate (a). After the said injection molding procedure (process step I), the particular recording layer (b), if necessary after application of intermediate layers, reflector layers, etc., is applied to the structured surface or surfaces ($a_1$) of the particular substrate (a) by vapor deposition, sputtering or solution coating (process step II). Thereafter, further layers which assist the functioning of the recording material can be applied to the particular recording layer (b). The recording material can then be provided with a cover.

The substrate (a)-forming blend of PPE and the part ($a_2$) to be used according to the invention can in principle be produced using any conventional mixing technique. For the purposes of the present invention, it has, however, proven particularly advantageous to prepare the blend by coextrusion of its components in a twin-screw devolatilization extruder. In this procedure, the part ($a_2$) of the blend is melted in the extruder, and the PPE, in the form of highly concentrated, preferably 10-80% strength solution in toluene or ethylbenzene, is metered continuously into the melt. The components are mixed homogeneously with one another in the extruder at from 200° to 400° C., the solvent being distilled off continuously. The PPE can, however, also be fed to the extruder in solid form, for example as granules. The resulting mixture is discharged from the extruder under clean-room conditions, granulated and fed to the injection molding machine. However, the blend can also be passed directly into the injection molding machine.

Analog or digital data can be recorded on the novel recording materials by means of a write laser beam; it is known that an analog modulated continuous-wave laser is used for recording analog data while a pulse-modulated laser is employed for recording digital data.

In general, suitable lasers have an output of from 1 to 20 mW at a recording wavelength λ. The diameter of the focus of the write laser beam is in general from 300 to 2,000 nm. In general, the pulse duration during exposure to a pulse-modulated laser is from 10 to 1,000 ns. A laser beam which has light of wavelength λ and is readily absorbed by the relevant recording layer (b) is advantageously used for recording. Wavelengths λ of from 400 to 1,000 nm are advantageous.

During the write operation, the laser beam is moved over the recording material relative to the latter and strikes the recording material at right angles or obliquely. Where it strikes at right angles, it can be focused on the recording layer (b), and where it strikes obliquely it must be focused on the said layer. At the point of contact, the recording layer (b) is locally heated and thermally altered regions are produced, for example in the form of holes, pits, spots, relief structures or magnetically reversed regions. For recording data using pulse-modulated laser beams, these regions essentially have a circular or oval base area possessing a diameter of from 100 to 2,000 nm; for recording by means of an analog-modulated continuous-wave laser, they may have base areas of any shape.

The novel recording materials are very suitable for all known types of laser-optical data recording. In particular, they are very useful for magneto-optical data recording.

The recording of data in the recording layer (b) can be effected from that side of the layer which faces away from the substrate (a) or through the optically transparent substrate (a). The latter procedure is particularly advantageous.

The recorded data are read by means of a read laser beam. The power of the read laser at the read wavelength λ' is below the threshold power above which recording is possible. In general, the beam power is from 0.1 to 2 mW. It is advantageous to use laser light of wavelength λ', which is strongly reflected by the recording layer. Wavelengths λ' of from 400 to 1,000 nm, in particular from 630 to 900 nm, are advantageous.

In the read operation too, the read laser beam is moved over the recording material relative to the latter and strikes the said recording material at right angles or obliquely. Where it strikes at right angles, it can be focused on the recording layer (b); where it strikes obliquely, it must be focused on the said layer.

If the read laser beam meets a thermally altered region when passing over the recording layer (b), the properties of the light transmitted or reflected by the recording material change, and this can be detected by means of suitable detectors.

Reading of the data in the recording layer (b) can be effected from that side of the layer (b) which faces away from the substrate (a) or through the substrate (a), the latter procedure being advantageous. It is particularly advantageous to collect the reflected light.

Moreover, it is very particularly advantageous to use for this purpose write and read lasers which emit laser light in the infrared wavelenth range of 630 to 900 nm. It is also advantageous if the write wavelength λ is identical to the read wavelength λ' or differs only slightly from it. Light of these wavelengths is provided by conventional, known semiconductor lasers.

Thus, in a procedure which is preferred according to the invention, the novel recording materials are written on using pulse-modulated laser light of a wavelength λ from 630 to 900 nm, in particular from 740 to 850 nm, through the substrate (a).

In a procedure which is preferred according to the invention, the recording materials containing recorded information are then read by means of laser light of a wavelength λ' of from 630 to 900 nm, in particular from 740 to 850 nm, from the side of the substrate (a), the light reflected by the recording layer (b) being collected.

If the novel recording materials are in the form of disks, the conventional, known disk drives can be used for recording and reading digital data.

The recording materials according to the invention have a large number of particular advantages.

For example, they can be produced in a simple manner, and their property profile can be reproduced particularly readily and reliably.

Because of the particular advantageous properties of the blend forming the substrate (a), the substrates (a) can be injection molded under conditions which place a particularly small amount of stress on the material. This results in very outstanding shaping of the tracks, which have a constant good profile over the entire surface of the substrate (a). After their production, the substrates (a) do not exhibit any thermal deformation and have considerably reduced internal stress. Moreover, the PPE content of the blend can be reduced to below the content known from the prior art without the substrate (a) produced therefrom exhibiting birefringence. Reducing the proportion of PPE in the blend, which PPE is comparatively difficult to process, leads not only to a reduction in cost but also to a more exact injection molding process which can be carried out under less severe conditions. In this case, the relevant substrates (a) still have excellent heat distortion resistance and dimensional stability, a high modulus of elasticity and great hardness as well as extremely low water absorption. Furthermore, they absorb light having a wavelength λ greater than 600 nm to a very small extent, if at all, so that they are particularly suitable for the generally preferred method of recording and reading the data through the substrate (a). The substrates (a) are also very suitable for the production of audio and video compact disks. In addition to the abovementioned laser-optical recording materials having an amorphous, thermally alterable recording layer (b), the present invention accordingly also relates to audio or video compact disks which have a novel substrate (a) of the type described above. In the case of the compact disks, the data are not recorded in a recording layer by means of laser beams in the form of thermally altered regions but are transferred to the disk in a known manner by the mastering process, ie. pressed into the substrate (a) of the disk.

The tracking behavior of the novel recording materials is excellent, ie. the tracking servo means and autofocusing means of conventional known disk drives function very precisely in the case of the novel recording materials and respond to these even better than to recording materials which contain only prior art substrates.

In general, the novel recording materials have a longer life, can be written on using comparatively low laser power and have a signal-to-noise ratio of more than 45 dB. Because of their particularly high bit density and their extremely low bit error rate, the recording materials are very suitable for recording video signals. They are also useful as archive disks.

EXAMPLES AND COMPARATIVE EXPERIMENTS

In the following Examples and Comparative Experiments, the thickness of the individual layers was determined from scanning electron micrographs.

The signal-to-noise ratio was determined in a known manner for recording materials which have been written on with the aid of a pulse-modulated lasser (wavelength λ of emitted light: 830 nm; pulse duration 500 ns; light output: 6 mW) through the substrate (a). For this purpose, the recording materials were read through the substrate (a) by means of a continuous-wave laser (wavelength λ of emitted light: 780 nm; light output: 0.5 mW). The emitted read laser beam was moved continuously over the recording layers at a relative speed of 4 m/s. The light reflected by the recording materials was collected continuously and analyzed.

In the Examples and Comparative Experiments below, the substrates (a) used contained concentric tracks on their surface. The tracks serve for exact guidance of the write and read laser beams which are emitted by the laser-optical write and read head of the disk drive. For this purpose, the tracking servo means present in the laser-optical head must receive sharp optical signals. These signals are produced by diffraction of the laser light, reflected by the recording material to the laser-optical head, at the boundary between groove and land, the conventional photodiode arrangements being used for collecting and analyzing these light signals. Regarding the tracking behavior, ie. exact guidance of, in particular, the read laser beams, it is essential that there is high optical contrast between land and groove, since otherwise only weak and diffuse signals, or no signals at all, will be obtained. The latter is often the case for recording materials containing recorded information. However, this leads to a low signal-to-noise ratio and makes it more difficult to find recorded data. In general, therefore, the width of the signals and the difference between the intensity of the laser light reflected by a groove and that of laser light reflected by a land are used as a measure of the tracking quality. Whether this intensity difference is constant and high over the entire diameter of the recording material is another quality criterion.

Accordingly, the tracking behavior of the recording materials was determined below by reading the materials using a read laser beam (λ=780 nm; light output: 0.5 mW) transversely to the tracks. Measurement was carried out over the entire diameter of the recording material. The laser light reflected was collected by means of conventional optical arrangements, conveyed to photodiodes and converted by suitable electronic components into electrical signals whose magnitude was plotted as a function of the diameter. An evaluation was made as to whether the differences between the magnitude of the signals received from the land and that of the signals received from the grooves were constantly sharp and high over the entire diameter of the recording material, and the tracking behavior was rated as follows from the evaluation:

Very good—Sharp signals; large difference between the magnitudes of the land and groove signals, which is constant over the entire diameter;

Good—Sharp signals; small difference between the relevant signal magnitudes, which varies more or less greatly over the entire diameter;

Unsatisfactory—Broad, diffuse signals; small difference between the relevant signal magnitudes; this difference may furthermore vary more or less greatly over the entire diameter;

Poor—No difference between the relevant signal magnitudes.

In order to check whether recording on the recording materials had resulted in a change in their tracking behavior, both the unrecorded recording materials and those containing recorded information were measured and rated in the manner described above. Serious differences in the tracking quality of a recording material in the unrecorded state on the one hand and in the recorded state on the other hand represented a grave disadvantage. If this quality difference was small, starting from a high level, this demonstrated the particular advantage of the relevant recording materials.

The melt flow index (MFI) of the blends prepared, the rreflectivity (%) and the recording sensitivity (nj) of the recording layers (b) as well as the birefringence of the substrates (a) were determined by conventional methods of measurement.

EXAMPLES 1 AND 2 AND COMPARATIVE EXPERIMENT 1

Preparation and properties of substrate (a) to be used according to the invention (Examples 1 and 2) and of a known substrate (Comparative Experiment 1)

Blends in which the poly-(2,6-dimethylphenylene ether) proportion (PPE), according to U.S. Pat. No. 4 373 065, was insufficient completely to compensate the orientation birefringence of the blends were prepared under exactly comparable conditions. The blends had the following composition:

COMPARATIVE EXPERIMENT 1

32.5 kg of polystyrene prepared by free radical polymerization and having a weight average molecular weight $\overline{M}_w$ of $1.65 \times 10^5$ and 17.5 kg of poly-(2,6-dimethylphenylene ether) (PPE).

EXAMPLE 1

30.0 kg of polystyrene as in Comparative Experiment 1, 2.5 kg of a copolymer of α-methylstyrene (10% by weight) and p-methylstyrene (90% by weight) having a weight average molecular weight $\overline{M}_w$ of $9 \times 10^3$ and 17.5 kg of PPE as in Comparative Experiment 1.

EXAMPLE 2

27.5 kg of polystyrene as in Comparative Experiment 1, 5.0 kg of a copolymer as in Example 1 and 17.5 kg of PPE as in Comparative Experiment 1.

The part ($a_2$) of the blends (Comparative Experiment 1: polystyrene; Example 1 and 2: polystyrene plus copolymer) was melted in a twin-screw devolatilization extruder and the PPE was metered as a 60% strength solution in toluene into the particular melt.

The blends were homogenized in the twin-screw extruder in a residence time of 1 minute and with devolatilization at 280° C., discharged from the extruder under clean-room conditions and converted into granules.

The granules predried at 110° C. were injection molded under clean-room conditions on a 90 tonne injection molding machine and using a special mold for optical storage disks to give disks [substrate (a), Examples 1 and 2; known substrate, Comparative Experiment 1]. Concentric tracks were pressed into one side of the substrate by means of a nickel die inserted into the mold. The substrates were 1.2 mm thick and had a diameter of 130 mm; the pressed tracks were 70 nm deep and 0.6 μm wide (groove) with a spacing of 1.6 μm (land).

The injection molding parameters were set for each of the three blends, optimization being carried out mainly in respect of planarity of the substrates and minimum birefringence between crossed polarization filters. The results are shown in Table 1.

TABLE 1

| Injection molding parameters and property profile of the substrates | Comp. Exp. 1 | Example 1 | Example 2 |
|---|---|---|---|
| Melt flow index MFI according to DIN 53,735 of the blends at 300° C. and under an applied force of 5 kp (g/10 min) | 66 | 81 | 97 |
| Injection speed of the blends (mm/sec) | 90 | 100 | 120 |
| Optimum injection temperature of the blends (°C.) | 350 | 340 | 330 |
| Color of the substrates | yellow | yellow | pale yellow |
| Maximum birefringence of the disk in the radial region 25–60 mm (nm) | 15 | 2 | 2 |
| Track formation on the substrates | good | very good | very good |
| Planarity of the substrates | good | very good | very good |
| Maximum temperature of the (°C.) substrates in sustained use | 125 | 125 | 125 |

As the comparison shows, the novel substrates (a) of Examples 1 and 2 exhibit many improvements compared with the substrate of Comparative Experiment 1: the reduction in the melt viscosity led to a decrease in the injection temperature and to less thermal damage to the blends. Furthermore, shaping in the mold was substantially improved without the maximum temperature in sustained use being decreased. The dramatic reduction in the orientation birefringence to virtually unmeasurable values is particularly noteworthy. Accordingly, the novel substrates (a) (Examples 1 and 2) are clearly superior to the known substrate (Comparative Experiment 1).

EXAMPLES 3 AND 4 AND COMPARATIVE EXPERIMENT 2

Preparation and properties of novel recording materials (Examples 3 and 4) and of a known recording material (Comparative Experiment 2)

Two of the substrates (a) from each of Examples 1 and 2 (for Examples 3 and 4) and two known substrates from Comparative Experiment 1 (for Comparative Experiment 2) were coated at 3000 rpm on a spin-coating unit with a propanolic solution (4% by weight) of a mixture of dye which absorbs at λ=700–850 nm and a solution polymer of methyl methacrylate and methacrylic acid. The weight ratio of dye to polymer was 70:30. The dye used was a triquinocyclopropane dye. Drying gave recording materials having recording layers (b) about 100 nm thick, whose reflectivity for light of the wavelength λ=780 nm was determined as 19% (measured in a known manner through the substrate).

Two identical recording materials in each case were adhesively bonded in the form of a sandwich with the dye layers facing inward, a 300 μm thick ring being placed in between as a spacer.

Digital data were recorded in the grooves of the recording materials on a disk drive. The data were then read.

The results obtained are shown in Table 2.

TABLE 2

Laser-optical data recording using novel recording material and recording materials not according to the invention

| Parameter | Comparative Experiment 2[a] | Example 3[b] | Example 4[c] |
|---|---|---|---|
| Recording sensitivity | 1–2 nJ | 1–2 nJ | 1–2 nJ |
| Read signal | Good | Good | Good |
| Tracking behavior of the unrecorded recording material | Good | Very good | Very good |
| Tracking behavior of the recording material containing recorded information | Unsatisfactory | Good | Good |

[a] Substrate from Comparative Experiment 1
[b] Substrate (a) from Example 1
[c] Substrate (a) from Example 2

The results may be summarized as follows:

While the performance characteristics relating to the dye layer, such as recording sensitivity and read signal, were not influenced by the different substrates, the novel recording materials (Examples 3 and 4) showed substantially improved tracking. The very densely recorded parts of the known recording material could scarcely be read, whereas tracking could easily be maintained in the novel recording materials.

EXAMPLE 5

Preparation and properties of a novel recording material having a recording layer (b) of tellurium Tellurium was applied in a layer thickness of 50 nm by vapor deposition in an apparatus under reduced pressure to one side of a substrate (a) produced according to Example 1.

On a disk drive, digital data were recorded in the grooves and then read. The signal-to-noise ratio was 52 dB.

EXAMPLE 6

Preparation and properties of a novel magneto-optical recording material

A 90 nm thick AlN layer was applied by sputtering in an apparatus under greatly reduced pressure to a plurality of substrates (a) produced according to Example 1. Thereafter, a mixture composed of 2 parts by weight of Nd, 18 parts by weight of Dy, 95 parts by weight of Tb and 30 parts by weight of Co was applied under reduced pressure in a layer thickness of 75 nm. To protect the magneto-optical recording layer, a 50 nm thick $SiO_x$ layer was applied to the said recording layer by vapor deposition. On a disk drive, digital data were recorded in the recording layer and read magneto-optically. The signal-to-ratio was 50 dB throughout.

COMPARATIVE EXAMPLE 3

Preparation and properties of a magneto-optical recording material having a known substrate Example 6 was repeated, except that, instead of the substrates (a) to be used according to the invention, substrates from Comparative Experiment 1 were used.

The recording materials thus obtained had a signal-to-noise ratio of less than 45 dB.

EXAMPLE 7

Preparation and properties of an audio compact disk having a substrate (a) to be used according to the invention Audio compact disks were produced from the blend described in Example 1. For this purpose, the granules were predried and injection-molded using the same injection molding machine but a different mold with a compact disk die. The resulting substrates (a) had a diameter of 100 mm and were free of birefringence.

The pale yellow substrates (a) were provided with a thin aluminum layer by vapor deposition at reduced pressure and coated with a protective coating. The compact disks were played in a commercial apparatus; no differences were found in respect of the playback quality compared with the conventional polycarbonate disks.

We claim:

1. A sheet-like, multilayer, laser-optical recording material comprising
(a) a dimensionally stable, optically transparent and isotropic, homogeneous substrate and
(b) at least one amorphous, thermally alterable recording layer,
wherein the substrate (a)
   (a$_1$) has one or two structured surfaces, the structure being in the micrometer and/or submicrometer range, and is composed of a homogeneous blend of poly-(2,6-dimethylphenylene ether) (PPE) with one or more styrene polymers, the said blend being free of orientation birefringence and the content of PE in this blend being about 25–45% by weight, based on the blend, and
   (a$_2$) that part of the blend which is not PPE contains, in the respective appropriate amounts based on this part (a$_2$), at least one of the following groups:
   (a$_{21}$) from 0.1 to 8% by weight of cyanoethylene groups,
   (a$_{22}$) from 1 to 60% by weight of 1-methyl-1-phenylethylene groups,
   (a$_{23}$) from 1 to 60% by weight of 4'-methylphenylethylene groups, and
   (a$_{24}$) from 0.01 to 10% by weight of groups of the formula I

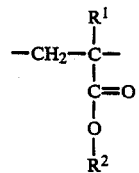

(a$_{25}$) regardless of whether one or more of the groups (a$_{21}$) to (a$_{24}$) and moreover any additives are present in (a$_2$), the part (a$_2$) in any case contains at least 40% by weight of phenylethylene groups and that
   (a$_{26}$) the groups (a$_{21}$), (a$_{22}$), (a$_{23}$) and/or (a$_{24}$) form the monomer units of one or more oligomeric or polymeric homopolymers or copolymers or of block or graft copolymers which have been separately prepared and then mixed with polystyrene.

2. A recording material as defined in claim 1, wherein, in the part (a$_2$) of the blend forming the substrate (a), the groups (a$_{22}$) and (a$_{23}$) form the monomer units of one or more oligomeric, random copolymers which have been separately prepared and then mixed with polystyrene.

3. A recording material as defined in claim 1, wherein the blend forming the substrate (a) essentially consists of PPE, polystyrene and one or more random α-methylstyrene/p-methylstyrene copolymers having a number average molecular weight $\overline{M}_n$ of from $5\times10^3$ to $1.5\times10^4$.

4. A recording material as defined in claim 1, wherein the blend forming the substrate (a) contains from 0.1 to 10% by weight, based on the part (a$_2$) of the blend, of additives which are present in molecular-disperse form in the blend and absorb light of a wavelength λ from 720 to 1,000 nm only weakly, if at all.

5. A recording material as defined in claim 4, wherein the blend forming the substrate (a) contains antioxidants, plasticizers, lubricants and/or dyes as additives.

6. A recording material as defined in claim 4, wherein the substrate (a) has concentric or spiral tracks or other structures suitable for guiding laser beams in one surface (a$_1$) and consists of a blend of, based on the blend,
from 34 to 40% by weight of PPE and
from 60 to 66% by weight of the part (a$_2$),
the part (a$_2$) of this blend consisting of, based on (a$_2$),
from 68.7 to 96.889% by weight of polystyrene having a weight average molecular weight $\overline{M}_w$ of more than $8\times10^4$, from 3 to 25% by weight of a random copolymer which contains, based on its amount, from 2 to 98% by weight of α-methylstyrene and from 98 to 2% by weight of p-methylstyrene as copolymerized units and has a weight average molecular weight $\overline{M}_w$ of from $7\times10^3$ to $2\times10^4$,
from 0.1 to 6% by weight of a plasticizer,
from 0.01 to 0.1% by weight of an antioxidant and
from 0.001 to 0.2% by weight of a dye which absorbs light of a wavelength λ>720 nm only weakly, if at all.

7. A sheet-like, multilayer, laser-optical recording material comprising
(a) a dimensionally stable, optically transparent and isotropic, homogeneous substrate and
(b) at least one amorphous, thermally alterable recording layer,
wherein the substrate (a)
   (a$_1$) has one or two structured surfaces, the structures being in the micrometer and/or submicrometer range,
   and is formed from a homogeneous blend of poly-(2,6-dimethylphenylene ether) (PPE) with polystyrene, the said blend being free of orientation birefringence and the content of PPE in this blend being about 25–45% by weight, based on the blend, and
   (a$_2$) that part of the blend which is not PPE consists of, based on this part (a$_2$), from 1 to 30% by weight of one or more oligomeric random α-methylstyrene/p-methylstyrene copolymers and from 0 to 10% by weight of additives, the remainder to 100% by weight being polystyrene.

8. A recording material as defined in claim 7, wherein the blend forming the substrate (a) consists of, based on this blend, from 34 to 40% by weight of PPE and from 60 to 66% by weight of the part (a$_2$).

9. A recording material as defined in claim 7, wherein the α-methylstyrene/p-methylstyrene copolymer has a number average molecular weight $\overline{M}_n$ of from $5 \times 10^3$ to $1.5 \times 10^4$.

10. A recording material as defined in claim 7, wherein the α-methylstyrene/p-methylstyrene copolymer has a weight average molecular weight of from $6 \times 10^3$ to $2.5 \times 10^4$, in particular from $7 \times 10^3$ to $2 \times 10^4$.

11. A recording material as defined in claim 7, wherein the α-methylstyrene/p-methylstyrene copolymer contains, based on the copolymer, from 2 to 98% by weight of α-methylstyrene and from 98 to 2% by weight of p-methylstyrene as copolymerized units.

12. A recording material as defined in claim 7, wherein the α-methylstyrene/p-methylstyrene copolymer in the part ($a_2$) is present in an amount of from 4 to 23% by weight, based on ($a_2$).

13. A recording material as defined in claim 7, wherein the blend forming the substrate (a) contains from 0.1 to 10% by weight, based on the part ($a_2$), of additives which are present in molecular-disperse form in the blend and absorb light of a wavelength λ from 720 to 1,000 nm only weakly, if at all.

14. A recording material as defined in claim 13, wherein antioxidants, plasticizers, lubricants and/or dyes are present as additives.

15. An audio or video compact disk having a dimensionally stable information carrier (a) possessing a structured surface with information-containing structures in the micrometer and/or submicrometer range and having one or more covering and/or protective layers present on the structured surface, the said information carrier (a) being formed from an optically transparent and isotropic, homogeneous blend of poly-(2,6-dimethylphenylene ether) (PPE) with one or more styrene polymers, the content of PPE in this blend being about 25-45% by weight, based on the blend, and the part ($a_2$) of the blend which is not PPE containing, in the respective appropriate amounts based on this part ($a_2$), at least one of the following groups:

($a_{21}$) from 0.1 to 8% by weight of cyanoethylene groups, ($a_{22}$) from 1 to 60% by weight of 1-methyl-1-phenylethylene groups, ($a_{23}$) from 1 to 60% by weight of 4'-methylphenylethylene groups, and ($a_{24}$) from 0.01 to 10% by weight of groups of the formula I

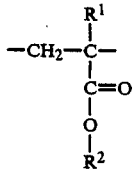

where $R^1$ is hydrogen or methyl and $R^2$ is $C_1$-$C_{10}$-alkyl, $C_5$-$C_8$-cycloalkyl or $C_6$-$C_{10}$-aryl, with the proviso that ($a_{25}$) regardless of whether one or more of the groups ($a_{21}$) to ($a_{24}$) and furthermore any additives are present in ($a_2$), the part ($a_2$) in any case contains at least 40% by weight of phenylethylene groups and that ($a_{26}$) the groups ($a_{21}$), ($a_{22}$), ($a_{23}$) and/or ($a_{24}$) form the monomer units of one or more oligomeric or polymeric homopolymers or copolymers or of block or graft copolymers which have been separately prepared and then mixed with polystyrene.

16. A compact disk as defined in claim 15, wherein, in the part ($a_2$) of the blend forming the information carrier (a), the groups ($a_{22}$) and ($a_{23}$) form the monomer units of one or more oligomeric, random copolymers which have been separately prepared and mixed with a polystyrene.

17. A compact disk as defined in claim 15, wherein the blend forming the information carrier (a) essentially consists of PPE, polystyrene and one or more random α-methylstyrene/p-methylstyrene copolymers having a number average molecular weight $\overline{M}_n$ of from $5 \times 10^3$ to $1.5 \times 10^4$.

18. A compact disk as defined in claim 15, wherein the blend forming the information carrier (a) contains from 0.1 to 10% by weight, based on the part ($a_2$) of the blend, of additives which are present in molecular-disperse form in the blend and absorb light of a wavelength λ from 720 to 1,000 nm only weakly, if at all.

19. A compact disk as defined in claim 18, wherein the blend forming the information carrier (a) contains antioxidants, plasticizers, lubricants and/or dyes as additives.

20. A compact disk as defined in claim 19, wherein the blend forming the information carrier (a) consists of
from 34 to 40% by weight of PPE and
from 60 to 66% by weight of the part ($a_2$),
the part ($a_2$) of this blend consisting of, based on ($a_2$),
from 68.7 to 96.889% by weight of polystyrene having a weight average molecular weight $\overline{M}_w$ of more than $8 \times 10^4$, from 3 to 25% by weight of a random copolymer which contains, based on its amount, from 2 to 98% by weight of α-methylstyrene and from 98 to 2% by weight of p-methylstyrene as copolymerized units and has a weight average molecular weight $\overline{M}_w$ of from $7 \times 10^3$ to $2 \times 10^4$,
from 0.1 to 6% by weight of a plasticizer,
from 0.01 to 0.1% by weight of an antioxidant and
from 0.001 to 0.2% by weight of a dye which absorbs light of a wavelength λ > 720 nm only weakly, if at all.

21. An audio or video compact disk having a dimensionally stable information carrier (a) possessing a structured surface with information-containing structures in the micrometer and/or submicrometer range and having one or more covering and/or protective layers present on the structured surface, the said information carrier (a) being formed from an optically transparent and isotropic, homogeneous blend of poly-(2,6-dimethylphenylene ether) (PPE) with polystyrene, the content of PPE in this blend being about 25-45% by weight, based on the blend, and the part ($a_2$) of the blend which is not PPE consisting of, based on this part ($a_2$),
from 1 to 30% by weight of one or more oligomeric random α-methylstyrene/p-methylstyrene copolymers and
from 0 to 10% by weight of additives, the remainder to 100% by weight being polystyrene.

22. A compact disk as defined in claim 21, wherein the blend forming the information carrier (a) consists of, based on this blend, from 34 to 40% by weight of PPE and from 60 to 66% by weight of the part ($a_2$).

23. A compact disk as defined in claim 21, wherein the α-methylstyrene/p-methylstyrene copolymer has a number average molecular weight $\overline{M}_n$ of from $5 \times 10^3$ to $1.5 \times 10^4$.

24. A compact disk as defined in claim 21, wherein the α-methylstyrene/p-methylstyrene copolymer has a weight average molecular weight of from $6 \times 10^3$ to $2.5 \times 10^4$, in particular from $7 \times 10^3$ to $2 \times 10^4$.

25. A compact disk as defined in claim 21, wherein the α-methylstyrene/p-methylstyrene copolymer contains, based on the copolymer, from 2 to 98% by weight of α-methylstyrene and from 98 to 2% by weight of p-methylstyrene as copolymerized units.

26. A compact disk as defined in claim 21, wherein the α-methylstyrene/p-methylstyrene copolymer is present in the part ($a_2$) in an amount of from 4 to 23% by weight, based on ($a_2$).

27. A compact disk as defined in claim 21, wherein the blend forming the information carrier (a) contains from 0.1 to 10% by weight, based on the part ($a_2$), of additives which are present in molecular-disperse form in the blend and absorb light of a wavelength $\lambda$ from 720 to 1,000 nm only weakly, if at all.

28. A compact disk as defined in claim 27, wherein antioxidants, plasticizers, lubricants and/or dyes are present as additives.

* * * * *